(12) United States Patent
Hamborg et al.

(10) Patent No.: US 9,102,316 B2
(45) Date of Patent: Aug. 11, 2015

(54) METHOD FOR ASSISTING IN THE CALCULATION OF A VEHICLE SPEED IN A VEHICLE

(75) Inventors: Jan-Oliver Hamborg, Heilbronn (DE); Frank Werner, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 266 days.

(21) Appl. No.: 13/808,383

(22) PCT Filed: Jun. 9, 2011

(86) PCT No.: PCT/EP2011/059584
§ 371 (c)(1),
(2), (4) Date: Mar. 14, 2013

(87) PCT Pub. No.: WO2012/004079
PCT Pub. Date: Jan. 12, 2012

(65) Prior Publication Data
US 2013/0173133 A1    Jul. 4, 2013

(30) Foreign Application Priority Data
Jul. 6, 2010  (DE) .......................... 10 2010 031 003

(51) Int. Cl.
*B60T 8/32* (2006.01)
*B60W 10/184* (2012.01)
*B60T 8/172* (2006.01)
*B60W 40/105* (2012.01)
*B60W 10/04* (2006.01)
*B60W 10/188* (2012.01)

(52) U.S. Cl.
CPC .............. *B60W 10/184* (2013.01); *B60T 8/172* (2013.01); *B60W 10/04* (2013.01); *B60W 40/105* (2013.01); *B60T 2201/09* (2013.01); *B60T 2201/14* (2013.01); *B60T 2250/04* (2013.01); *B60T 2270/604* (2013.01); *B60W 10/188* (2013.01); *B60W 2520/28* (2013.01); *B60W 2710/182* (2013.01)

(58) Field of Classification Search
CPC ........... B60L 3/102; B60L 3/104; B60T 8/00; B60T 8/1764; B60T 8/267; B60T 17/221
USPC ........ 303/112, 151, 169; 188/159; 701/70, 72
See application file for complete search history.

(56) References Cited

U.S. PATENT DOCUMENTS 7,093,913 B2    8/2006    Schafiyha et al.
7,222,923 B2 *  5/2007    Banno et al. .................. 303/169

FOREIGN PATENT DOCUMENTS

WO    WO 03/064227    8/2003
WO    WO 2006/045467    5/2006

OTHER PUBLICATIONS

International Search Report, PCT International Application No. PCT/EP2011/059584, dated Sep. 13, 2011.

* cited by examiner

*Primary Examiner* — Adam Tissot
(74) *Attorney, Agent, or Firm* — Kenyon & Kenyon LLP

(57) ABSTRACT

In a method for assisting the calculation of vehicle speed in a vehicle that comprises an axle differential on at least one vehicle axle and a braking device for decelerating individual wheels of the vehicle axle, in the case of deceleration of the vehicle via the drive train, one wheel of the vehicle axle is additionally decelerated by way of the braking system, the rotation speed of the oppositely located wheel being taken as the basis for ascertaining the vehicle speed.

15 Claims, 2 Drawing Sheets

METHOD FOR ASSISTING IN THE CALCULATION OF A VEHICLE SPEED IN A VEHICLE

FIELD OF THE INVENTION

The present invention relates to a method for assisting the calculation of vehicle speed in a vehicle.

BACKGROUND INFORMATION

Conventionally, measured wheel rotation speeds are used as the basis for calculating vehicle speed. If the measurement occurs during deceleration of the vehicle simultaneously with engagement of an ABS antilock system, the wheel rotation speeds are affected by slip. If, in this situation, the brake pressure at individual wheels is at least slightly lowered, the wheel rotation speed that can be taken as the basis for calculating vehicle speed is thus increased. A prerequisite for this method, however, is that braking torques can be modulated at individual wheels of the vehicle, which is usually the case with hydraulic wheel braking devices.

In the case of braking devices that apply a braking torque via the drive train in the vehicle, for example during recuperative braking in hybrid or electric vehicles, or in the context of retarders in commercial vehicles, it is not possible to reduce the braking torque at only a single wheel in order to accelerate that wheel. On road surfaces having a low coefficient of friction, the result is that all the wheels are uniformly affected by brake slip, which can lead to a systematic error in calculating the vehicle speed. The calculated vehicle speed is lower than the actual speed, which can result in an overbraked vehicle with reduced steerability, and unstable vehicle behavior.

SUMMARY

An object of the present invention is to determine vehicle speed with high accuracy in a vehicle that is decelerated by way of the drive train.

An example method according to the present invention for assisting the calculation of vehicle speed is usable in vehicles that have, on at least one vehicle axle, an axle differential with which rotation-speed differences between the left and the right vehicle wheel of the same axle can be compensated for. The vehicle further encompasses a braking device for decelerating individual wheels of the vehicle axle, for example a hydraulic or electrohydraulic braking system with which individual-wheel braking torques can be generated.

In order to determine the vehicle speed, in the case of a deceleration of the vehicle via the drive train, one wheel of the vehicle axle that is equipped with an axle differential is additionally impinged upon, by way of the braking system, with a greater braking torque than the opposite wheel on the same vehicle axle. Because the inertia of the drive train is large as compared with the inertia of a vehicle wheel, the average differential rotation speed changes only slightly with respect to the rotation speed of the braked wheel. As a result of the differential effect of the axle differential, the vehicle wheel located on the same axle opposite the additionally decelerated wheel is accelerated. The acceleration effect occurs absolutely, but at least relatively with respect to the actively braked wheel. The wheel speed of the accelerated wheel thus approaches the vehicle speed, and the wheel speed, or the rotation speed of the accelerated wheel, can be taken as the basis for calculating the vehicle speed.

With this method, vehicle speed is possible to determine with high accuracy even in the context of deceleration via the drive train of the vehicle. In the context of deceleration via the drive train, individual-wheel braking torque distribution does not occur; instead, the vehicle axle, and thus also the wheels, are uniformly impinged upon by braking torque. Braking situations of this kind occur, for example, in the context of recuperative braking in order to recharge an electric motor used for drive purposes in the vehicle; this refers both to an exclusively electric-motor drive system and to a hybrid drive system in which an internal combustion engine is also used as a drive source in addition to the electric motor. In addition, braking occurs via the drive train in the case of retarder brakes in commercial vehicles. In this case as well, it is useful to assist the determination of speed by way of the above-described method. Engine drag torques in internal combustion engines also result in deceleration of the drive train.

The example method according to the present invention is appropriate in the context of vehicles driven via a single axle, and also for all-wheel-drive vehicles.

In the example method, preferably only one wheel of an axle is decelerated via the wheel braking device, whereas no active braking torque is applied via the wheel braking device to the oppositely located wheel on the same vehicle axle, which is equipped with an axle differential. It is, however, also possible in principle to decelerate both wheels of an axle but with a non-identical braking torque, in which context the braking torque difference between the wheels results, via the differential effect of the axle differential, in a relative acceleration of the less-decelerated wheel as compared with the more greatly decelerated wheel.

The example method can be utilized in all driving situations, i.e. both when driving straight ahead and when cornering.

According to a useful refinement, provision is made that the wheels on one common vehicle axle are individually decelerated successively, the wheels that in each case are not decelerated, or the wheels acted upon by a lower braking torque, being taken as the basis for rotation speed determination in order to assist the vehicle speed. Deceleration preferably occurs in immediate succession. This procedure has the advantage that the yaw torques occurring upon deceleration of a single wheel at least approximately cancel one another out, so that the vehicle behavior is impaired only to a small extent or not at all. Yaw torques do occur upon successive deceleration at the wheels of an axle in a correspondingly successive fashion; but because they are oppositely directed, they at least substantially cancel one another out in terms of their effect on the vehicle as a whole.

It may be further useful, for the instance in which an axle differential is disposed on each of two vehicle axles, to decelerate one wheel of each vehicle axle and to take the rotation speeds of the undecelerated, or less-decelerated, wheels as the basis for determining the vehicle speed. In this context, in particular, wheels of the two vehicle axles located diagonally opposite one another are decelerated, in order to achieve compensation for yaw torques. The diagonally opposite wheels are, in particular, decelerated simultaneously in this context, preferably beginning at the same instant and ending at the same instant, and usefully with a braking torque of the same magnitude; if applicable, braking torques of different magnitudes, as well as shifted beginning and/or ending times, may also be appropriate. Diagonal deceleration of individual wheels can be combined with successive, crosswise alternation of the deceleration of the wheels of the same vehicle axle, so that two successive diagonal braking operations, with an alternating diagonal, are carried out.

BRIEF DESCRIPTION OF THE DRAWINGS

Further advantages and useful embodiments may be gathered from the description below and the Figures.

DETAILED DESCRIPTION OF EXAMPLE EMBODIMENTS

Figure 1:
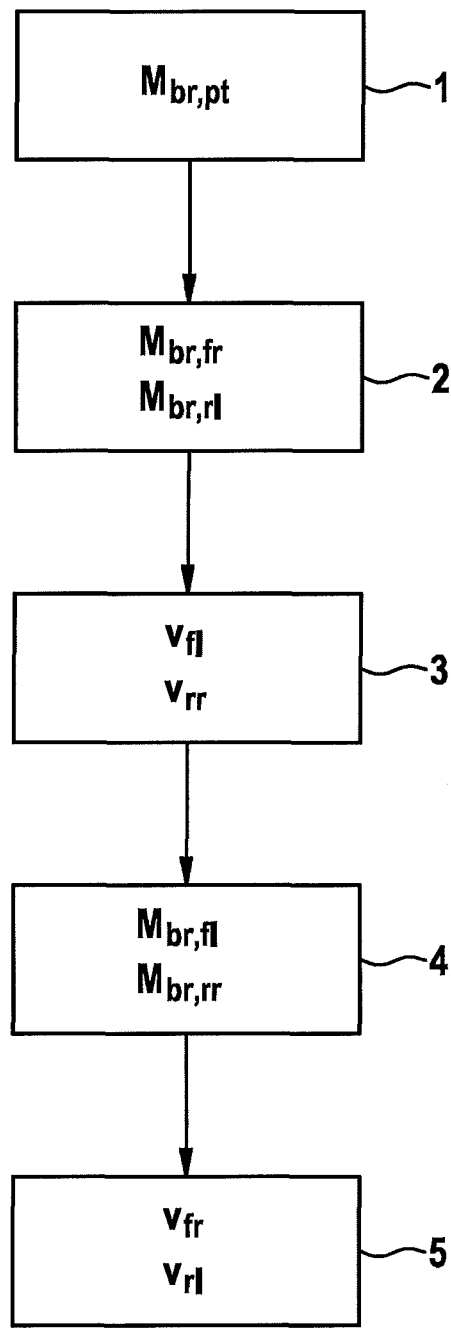
FIG. 1 is a flow diagram for determining vehicle speed in a vehicle having axle differentials on both vehicle axles.

FIG. 1 shows a flow diagram for determining vehicle speed in a vehicle that is equipped with axle differentials on both vehicle axles and with a braking system with which the vehicle wheels can be individually decelerated. The method is utilized in situations in which, as depicted in FIG. 1 with block 1, a braking torque $M_{br,pt}$ is applied via the drive train of the vehicle. This torque $M_{br,pt}$ in the drive train occurs, for example, in the context of recuperative braking for recharging of an electric motor used for drive purposes in the vehicle, upon braking via a retarder, or as a result of engine drag torques of an internal combustion engine.

If a braking torque $M_{br,pt}$ of this kind exists in the drive train, according to block 2 an individual braking torque $M_{br,fr}$ is generated at the right front wheel, and $M_{br,rl}$ at the left rear wheel, via the braking system of the vehicle, for example a hydraulic or electrohydraulic braking system. The respectively oppositely located wheel on the axles, however, is not impinged upon by a braking torque via the braking system. Because of the differential effect, this results in an increase in the wheel rotation speeds of the respectively undecelerated vehicle wheels, and in an approach to the actual vehicle speed. According to block 3 this relates, because of the deceleration of the right front wheel and left rear wheel, to the wheel speeds $v_{fl}$ at the left front wheel and $v_{rr}$ at the right rear wheel. The wheel speeds can be taken as the basis for computational determination of the vehicle speed, and assist the vehicle speed.

Application of the wheel braking torques $M_{br,fr}$ and $M_{br,rl}$ to the diagonally opposite vehicle wheels occurs simultaneously. The increase in wheel speeds $v_{fl}$ and $v_{rr}$ at the respectively oppositely located vehicle wheels occurs immediately subsequently to application of the wheel braking torques.

In the next blocks 4 and 5, analogously to blocks 2 and 3, a wheel braking torque is applied and then the wheel speed is determined, the wheel braking torques being applied to the vehicle wheels located oppositely in terms of the first deceleration operation. According to block 4, a wheel braking torque $M_{br,fl}$ is generated at the left front wheel, and $M_{br,rr}$ at the right rear wheel, by the braking system, whereupon (because of the differential effect) the wheel speeds $v_{fr}$ at the right front wheel and $v_{rl}$ at the left rear wheel increase, and approach the actual vehicle speed; according to block 5, this can be ascertained and can then be taken as the basis for a calculation of vehicle speed.

Figure 2:
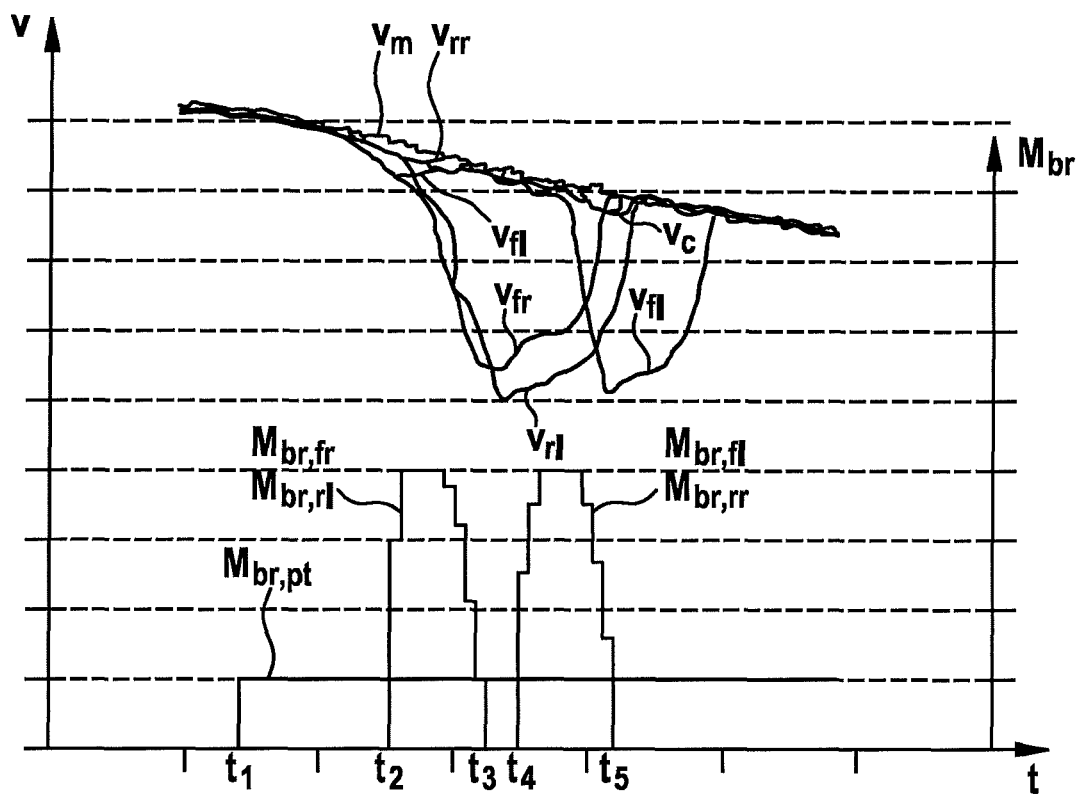
FIG. 2 is a diagram showing curves for braking torques and wheel speeds.

FIG. 2 is a diagram showing curves for braking torque as well as vehicle speed and wheel speeds. The initial situation is application of a braking torque $M_{br,pt}$ in the drive train at time $t_1$, the braking torque in the drive train assuming, by way of example, a constant value. At time $t_2$, a wheel braking torque $M_{br,fr}$ at the right front wheel, and $M_{br,rl}$ at the left rear wheel, is additionally generated; the braking torque curve for these two vehicle wheels is identical, and ends at time $t_3$.

The relevant speed curves are labeled $v_m$ for the measured vehicle speed and $v_c$ for the calculated vehicle speed, and the individual wheel speeds are also plotted. As a result of the application of wheel braking torques at the right front wheel and left rear wheel, the wheel speeds $v_{fr}$ and $v_{rl}$ for the right front wheel and left rear wheel correspondingly drop, and rise once again after termination of the wheel braking torques at time $t_3$. Because of the differential effect, the wheel speeds $v_{fl}$ at the left front wheel and $v_{rr}$ at the right rear wheel increase immediately after generation of the individual wheel braking torques, and approach the actual vehicle speed $v_m$ ascertained by measurement. Correspondingly, the value of the calculated vehicle speed $v_c$, which is ascertained in consideration of the improved wheel speeds $v_{fl}$ and $v_{rr}$ at the left front wheel and right rear wheel, respectively, also approaches the measured vehicle speed $v_m$.

A further application of a wheel braking torque occurs between times $t_4$ and $t_5$. The left front wheel is decelerated by application of a wheel braking torque $M_{br,fl}$, and the right rear wheel by application of a wheel braking torque $M_{br,rr}$. As may be gathered from the relevant speed curves, the wheel speed $v_{fl}$ at the left front wheel decreases, and by way of the differential effect the wheel speed $v_{fr}$ at the right front wheel rises sharply and approaches the value of the measured vehicle speed $v_m$.

The wheel speed $v_{rr}$ at the right rear wheel does not drop in the same fashion as the wheel speed $v_{fl}$ at the left front wheel, but instead remains approximately at the level of the measured vehicle speed $v_m$. The reason for this is a higher coefficient of friction at the right rear wheel, which prevents a decrease in speed. Because the slippage at the right rear wheel is comparatively low because of the high coefficient of friction, the wheel speed at the right rear wheel, or optionally at the left rear wheel, can be taken as the basis for ascertaining the vehicle speed.

What is claimed is:

1. A method for assisting calculation of a vehicle speed in a vehicle having a braking system, the method comprising:
   decelerating individual wheels, via a braking device, of at least one vehicle axle, wherein the vehicle includes an axle differential;
   decelerating the vehicle via a drive train, one wheel of the vehicle axle being additionally impinged upon, by the braking system, with a greater braking torque than an opposite wheel disposed on the same vehicle axle; and
   ascertaining, using a processor, the vehicle speed based on a rotation speed of the opposite wheel;
   wherein one axle differential is disposed respectively on at least two vehicle axles, and one wheel of the at least two vehicle axles is respectively decelerated, wherein rotation speeds of one of undecelerated or less-decelerated wheels being taken as the basis for ascertaining the vehicle speed, and
   wherein diagonally oppositely located wheels of the two vehicle axles are decelerated.

2. The method as recited in claim 1, wherein the diagonally oppositely located wheels of the two vehicle axles are decelerated simultaneously.

3. A method for assisting calculation of a vehicle speed in a vehicle having a braking system, the method comprising:
   decelerating individual wheels, via a braking device, of at least one vehicle axle, wherein the vehicle includes an axle differential;
   decelerating the vehicle via a drive train, one wheel of the vehicle axle being additionally impinged upon, by the braking system, with a greater braking torque than an opposite wheel disposed on the same vehicle axle; and
   ascertaining, using a processor, the vehicle speed based on a rotation speed of the opposite wheel;

wherein one axle differential is disposed respectively on at least two vehicle axles, and one wheel of the at least two vehicle axles is respectively decelerated, wherein rotation speeds of one of undecelerated or less-decelerated wheels being taken as the basis for ascertaining the vehicle speed, and wherein wheels on one common vehicle axle are individually decelerated successively.

4. The method as recited in claim 1, further comprising:
using the method in the case of recuperative braking to recharge an electric motor used for drive purposes in the vehicle.

5. The method as recited in claim 1, further comprising:
using the method in the case of braking via a retarder in the vehicle.

6. The method as recited in claim 1, further comprising:
using the method in the case of braking of the vehicle via engine drag torques of an internal combustion engine used in the vehicle.

7. The method as recited in claim 1, further comprising:
using the method in an all-wheel-drive vehicle.

8. An open- or closed-loop control device for assisting calculation of a vehicle speed in a vehicle having a braking system, comprising:

an ascertaining arrangement, including a processor, to ascertain the vehicle speed based on a rotation speed of an opposite wheel;

wherein there is a braking device for decelerating individual wheels of at least one vehicle axle, the vehicle including an axle differential, wherein there is a decelerating arrangement to decelerate the vehicle via a drive train, one wheel of the vehicle axle being additionally impinged upon, by the braking system, with a greater braking torque than the opposite wheel disposed on the same vehicle axle, wherein one axle differential is disposed respectively on at least two vehicle axles, and one wheel of the at least two vehicle axles is respectively decelerated, wherein rotation speeds of one of undecelerated or less-decelerated wheels being taken as the basis for ascertaining the vehicle speed, and wherein one of the following is satisfied: (i) diagonally oppositely located wheels of the two vehicle axles are decelerated, and (ii) wherein wheels on one common vehicle axle are individually decelerated successively.

9. A vehicle, comprising:
an open- or closed-loop control device for assisting calculation of a vehicle speed in a vehicle having a braking system, including:
an ascertaining arrangement, including a processor, to ascertain the vehicle speed based on a rotation speed of an opposite wheel;

wherein there is a braking device for decelerating individual wheels of at least one vehicle axle, the vehicle including an axle differential, wherein there is a decelerating arrangement to decelerate the vehicle via a drive train, one wheel of the vehicle axle being additionally impinged upon, by the braking system, with a greater braking torque than the opposite wheel disposed on the same vehicle axle, and wherein one axle differential is disposed respectively on at least two vehicle axles, and one wheel of the at least two vehicle axles is respectively decelerated, wherein rotation speeds of one of undecelerated or less-decelerated wheels being taken as the basis for ascertaining the vehicle speed, and wherein one of the following is satisfied: (i) diagonally oppositely located wheels of the two vehicle axles are decelerated, and (ii) wherein wheels on one common vehicle axle are individually decelerated successively.

10. The control device as recited in claim 9, wherein the diagonally oppositely located wheels of the two vehicle axles are decelerated simultaneously.

11. An open- or closed-loop control device for assisting calculation of a vehicle speed in a vehicle having a braking system, comprising:

an ascertaining arrangement, including a processor, to ascertain the vehicle speed based on a rotation speed of an opposite wheel;

wherein there is a braking device for decelerating individual wheels of at least one vehicle axle, the vehicle including an axle differential, wherein there is a decelerating arrangement to decelerate the vehicle via a drive train, one wheel of the vehicle axle being additionally impinged upon, by the braking system, with a greater braking torque than the opposite wheel disposed on the same vehicle axle, wherein one axle differential is disposed respectively on at least two vehicle axles, and one wheel of the at least two vehicle axles is respectively decelerated, wherein rotation speeds of one of undecelerated or less-decelerated wheels being taken as the basis for ascertaining the vehicle speed, and wherein wheels on one common vehicle axle are individually decelerated successively.

12. The control device as recited in claim 8, wherein recuperative braking is used to recharge an electric motor used for drive purposes in the vehicle.

13. The control device as recited in claim 8, wherein braking is via a retarder in the vehicle.

14. The control device as recited in claim 8, wherein there is braking of the vehicle via engine drag torques of an internal combustion engine used in the vehicle.

15. The control device as recited in claim 8, wherein the vehicle is an all-wheel-drive vehicle.

* * * * *